INVENTOR
HARRY CHANOWITZ
by
Mason, Kolehmainen, Rathburn and Wyss
ATTORNEYS.

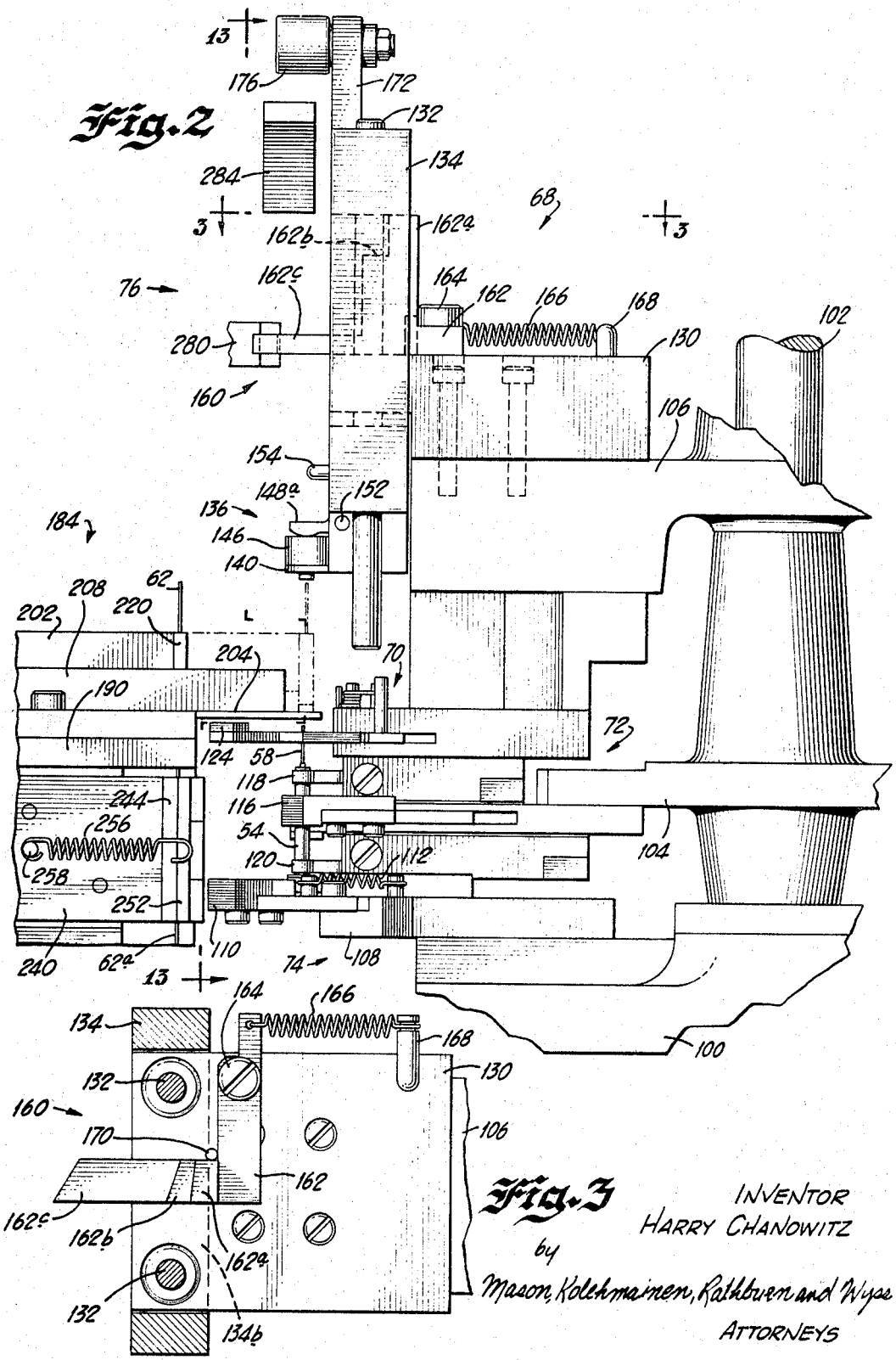

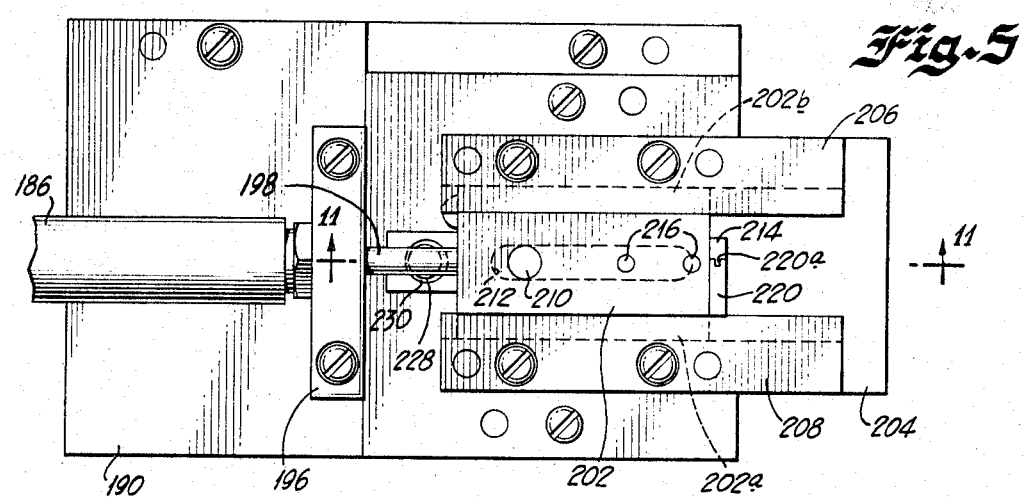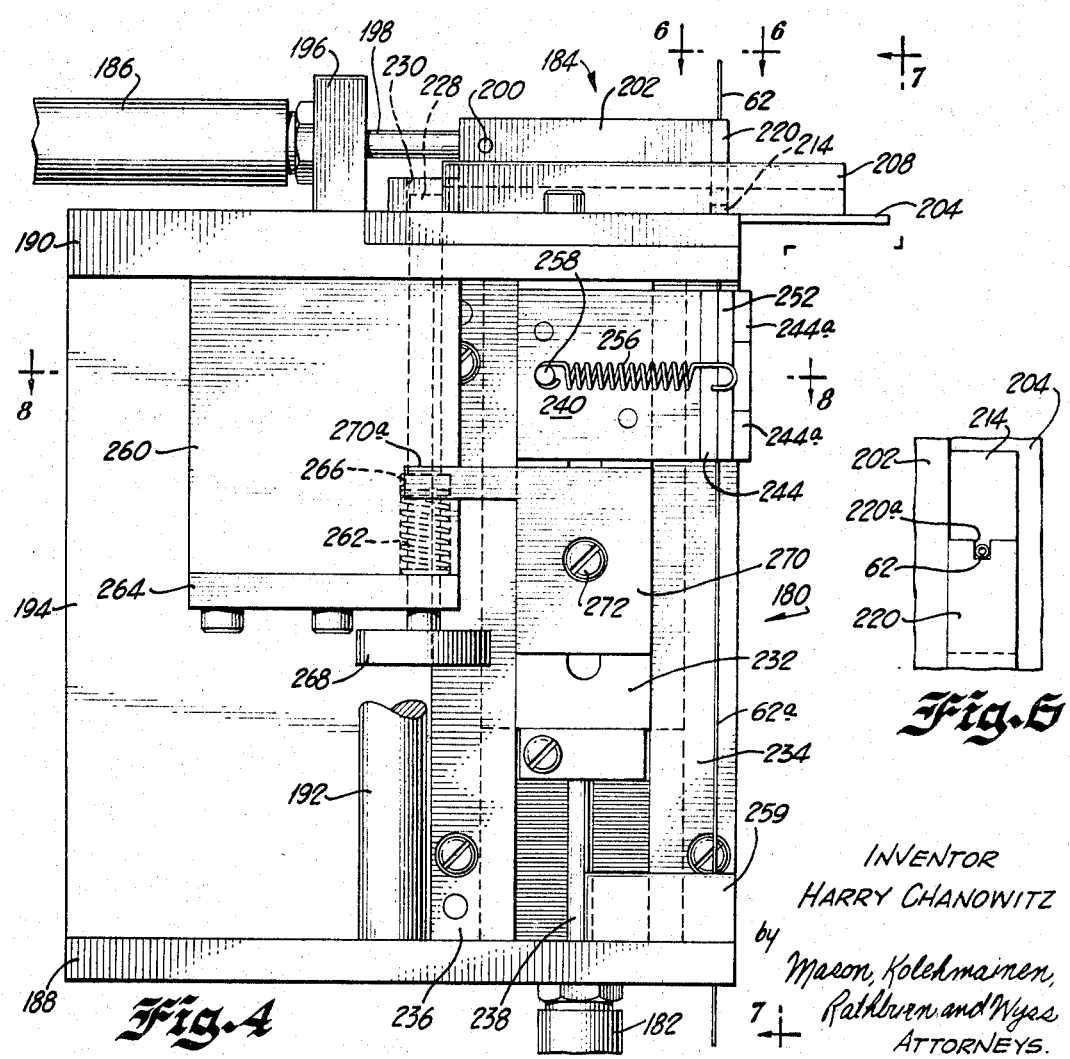

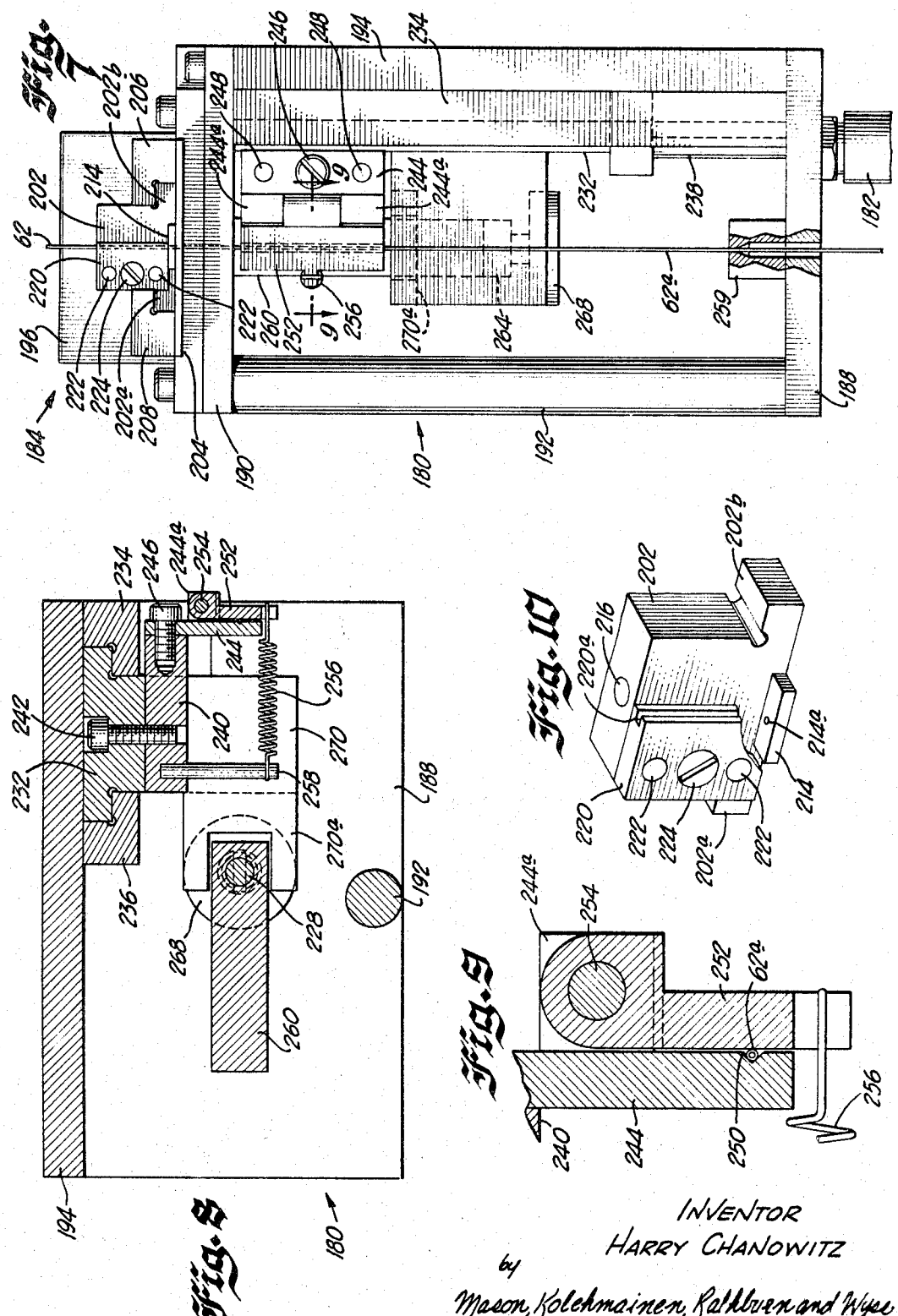

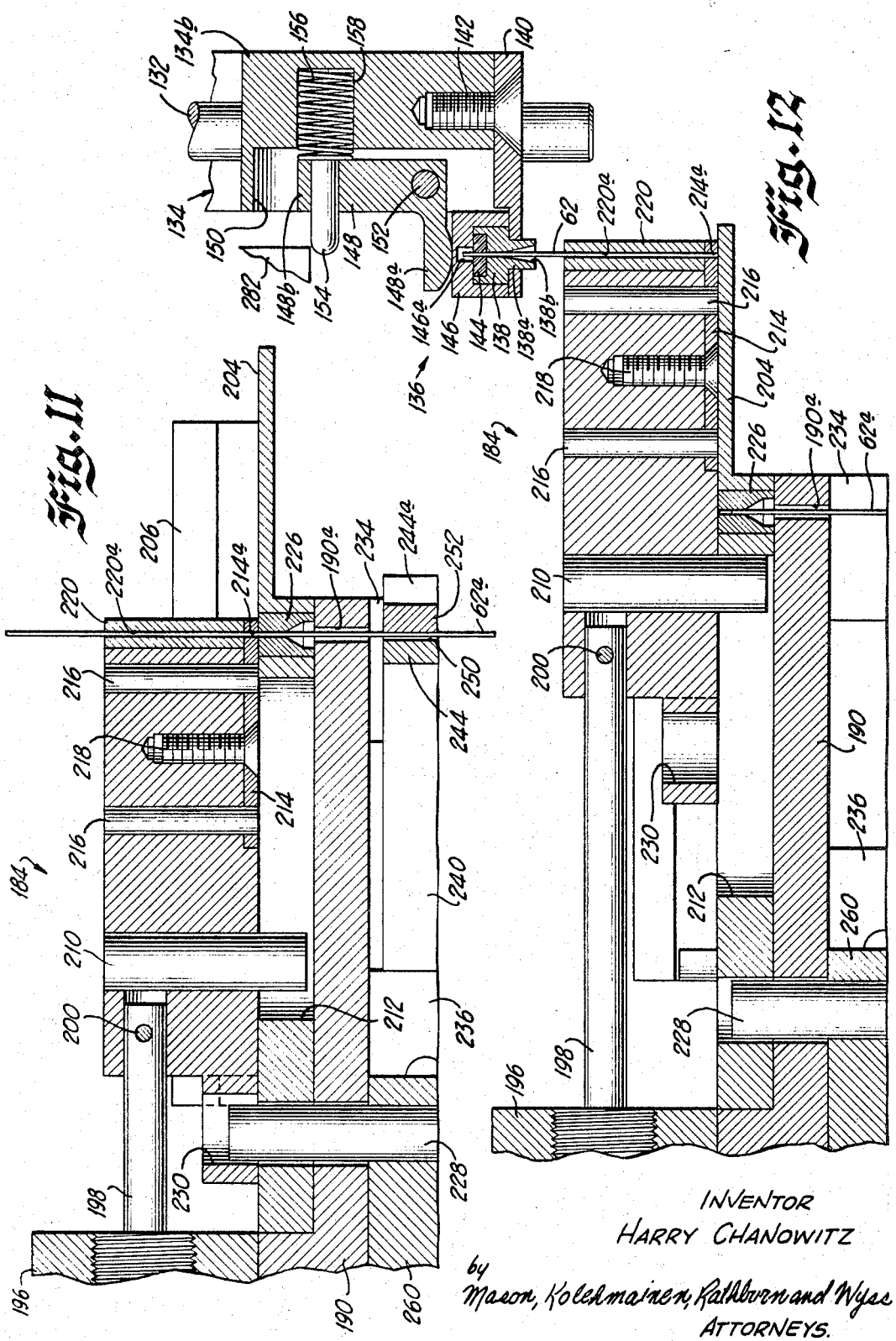

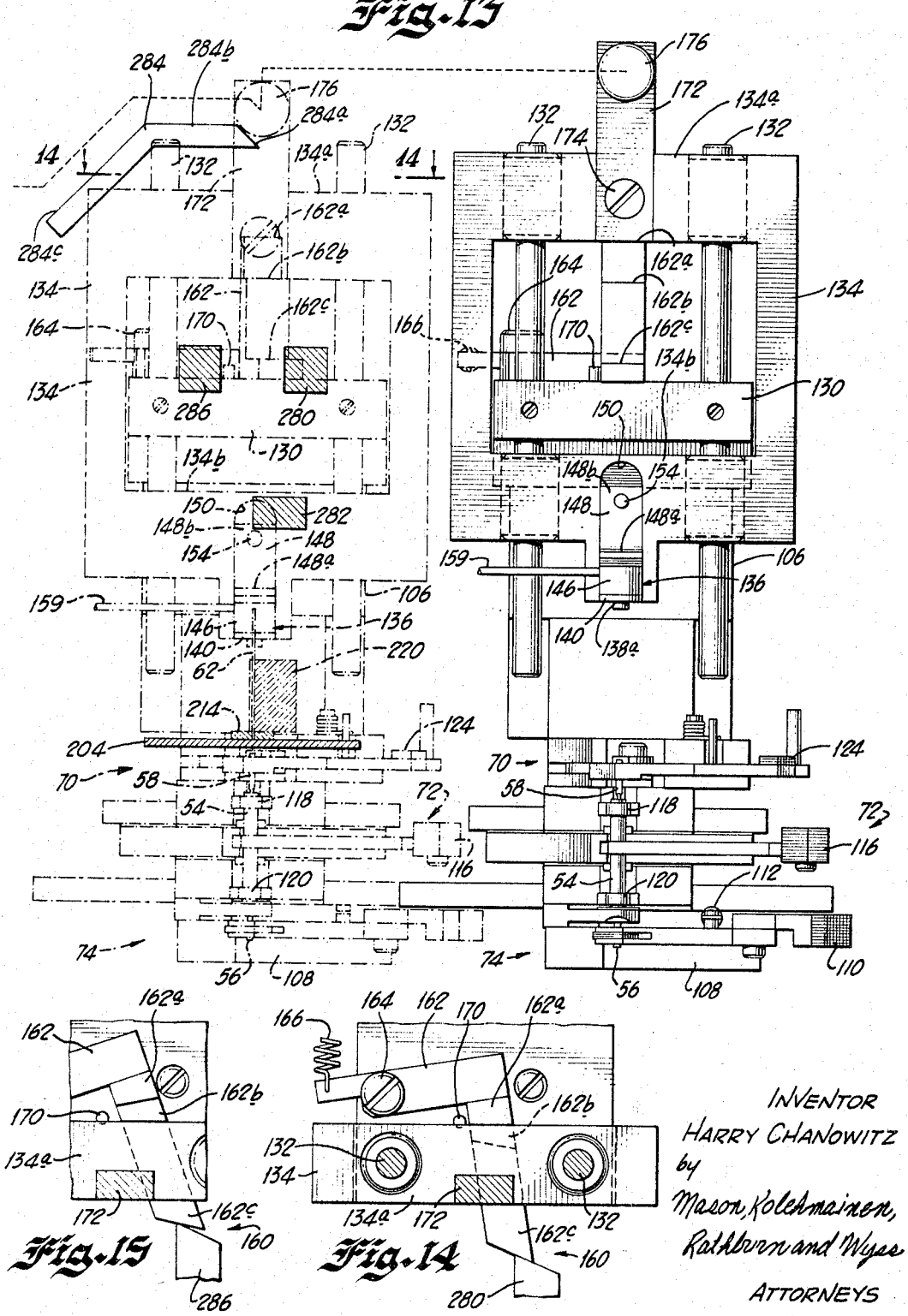

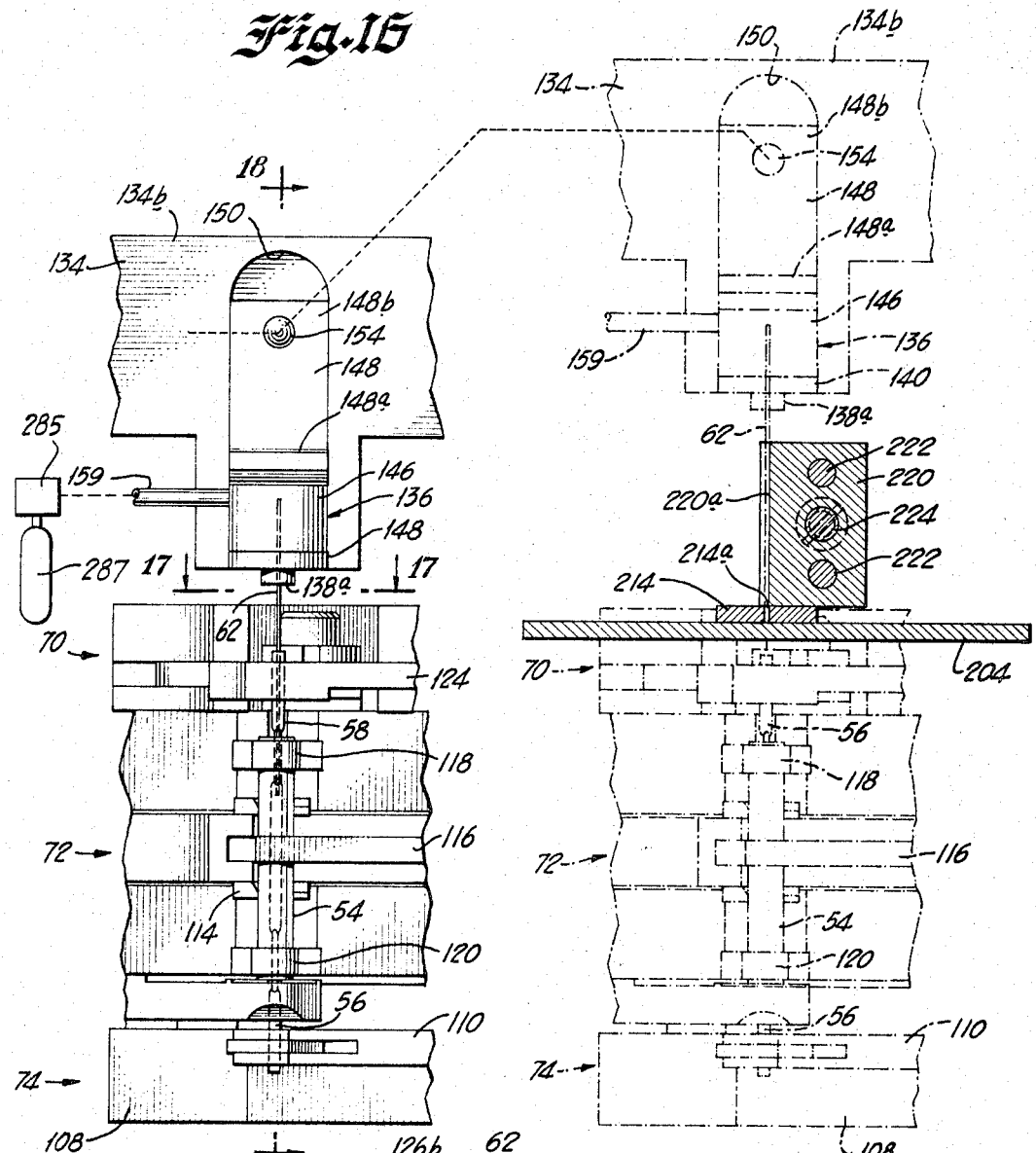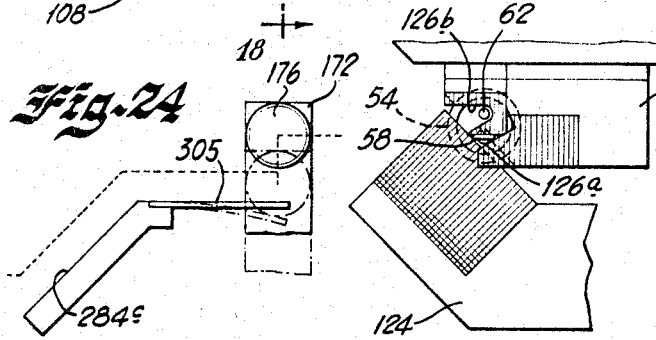

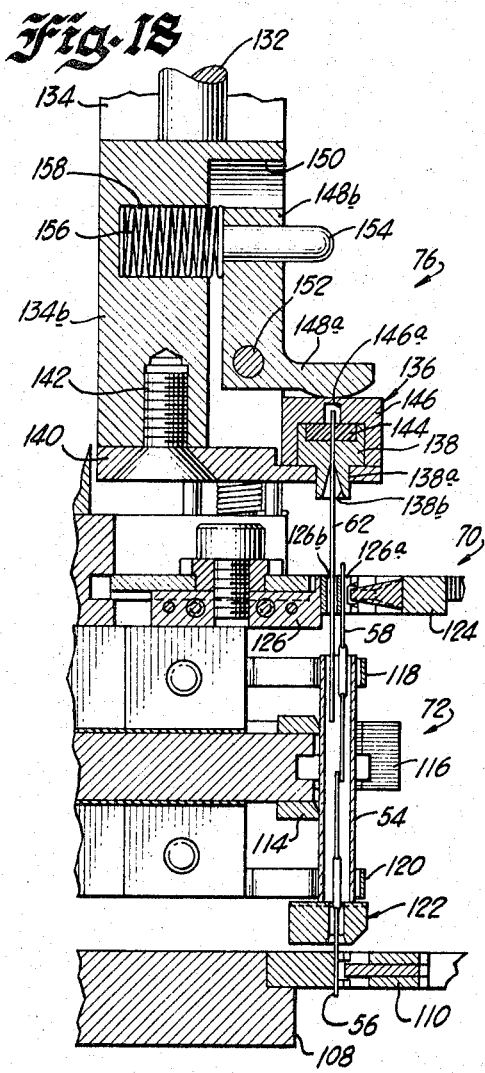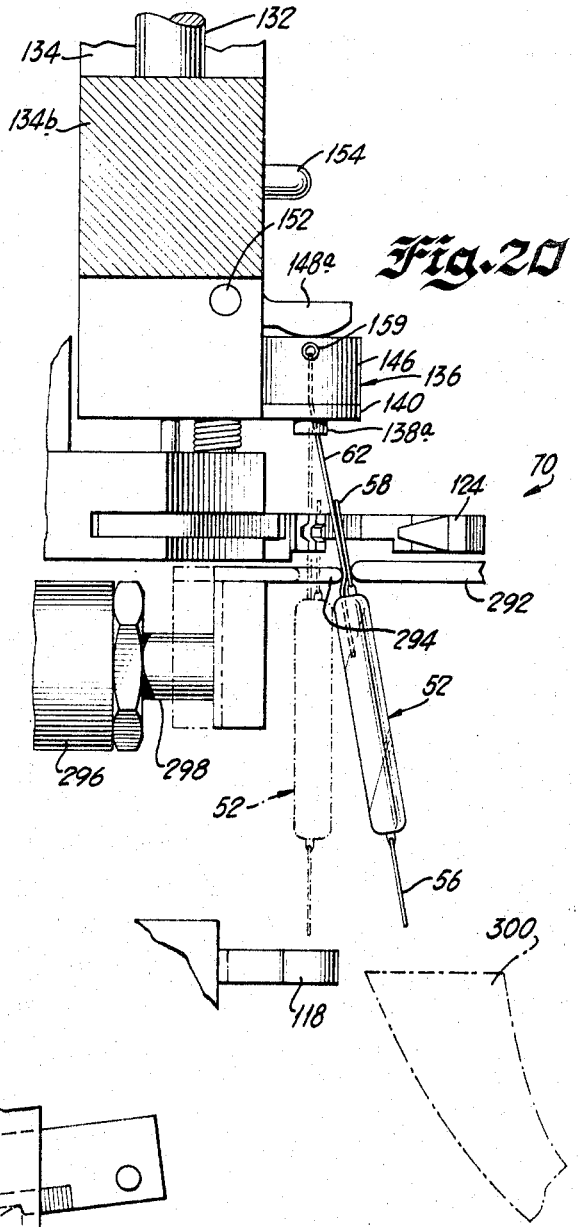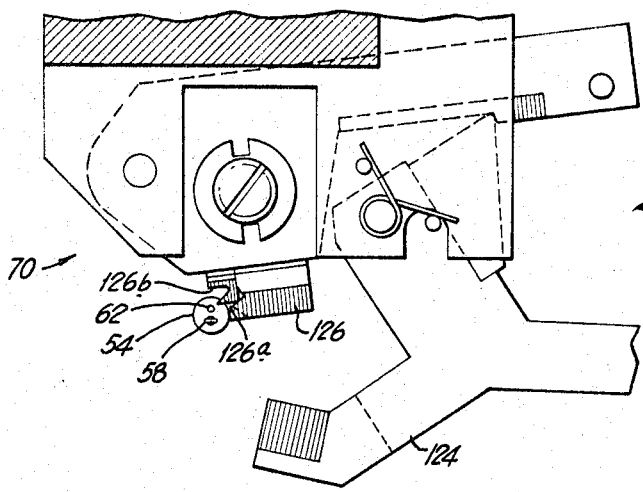

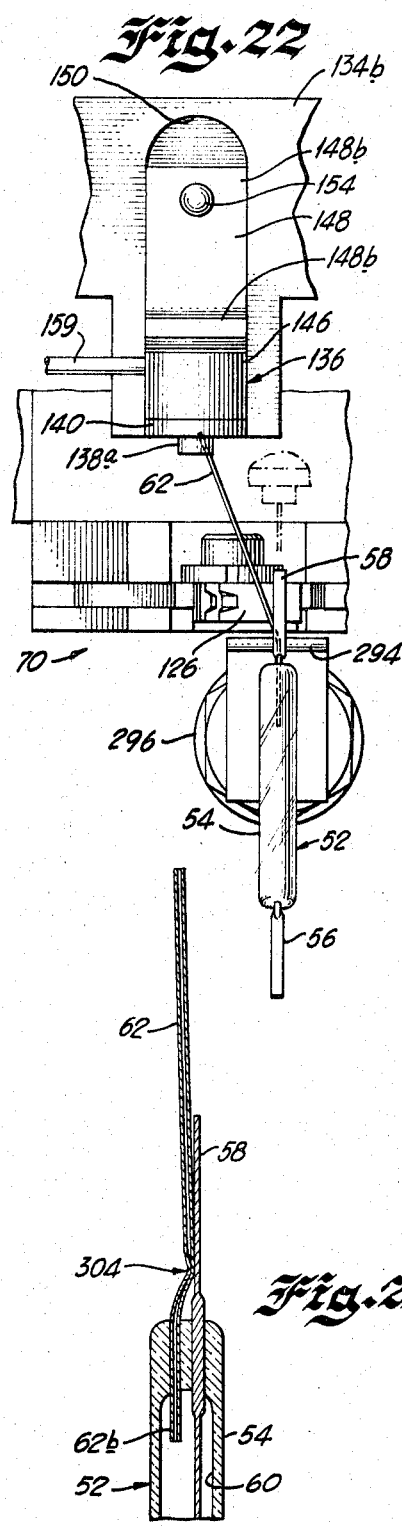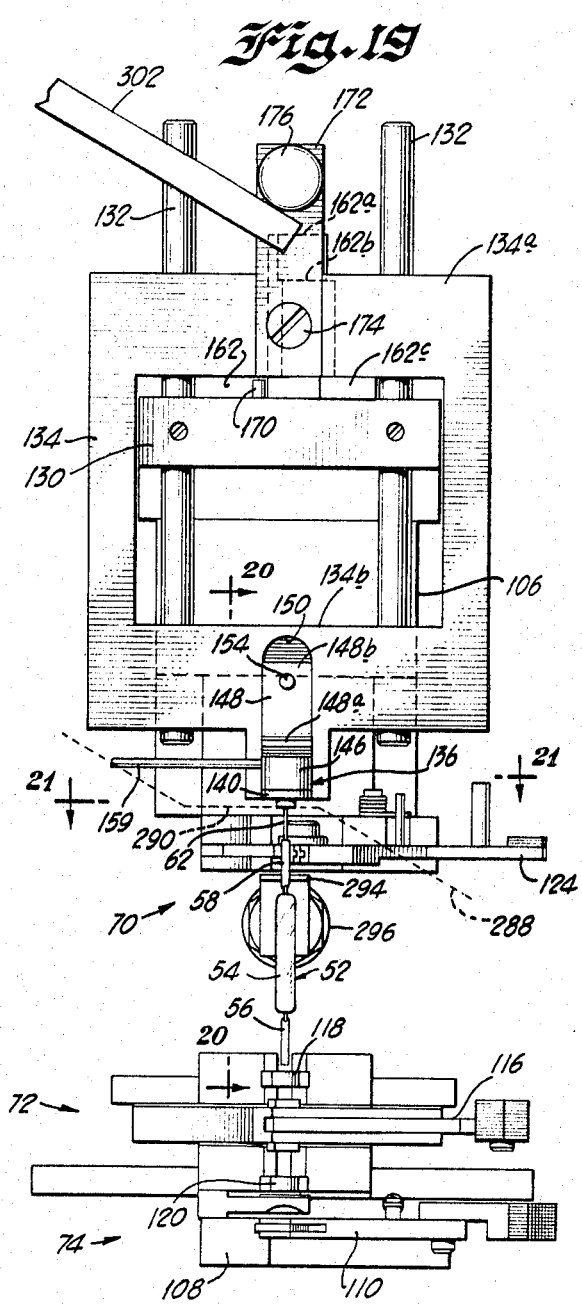

United States Patent Office 3,421,874
Patented Jan. 14, 1969

3,421,874
APPARATUS FOR MAKING PRESSURIZED
REED SWITCHES
Harry Chanowitz, Skokie, Ill., assignor to C. P. Clare &
Company, Chicago, Ill., a corporation of Delaware
Filed Jan. 17, 1966, Ser. No. 521,078
U.S. Cl. 65—155                                           12 Claims
Int. Cl. C03c 27/04; H01h 11/00

ABSTRACT OF THE DISCLOSURE

A machine for making pressurized reed switches includes a tubulation cutter which severs a section of tubulation from a length thereof and transfers the cut section to a point adjacent the path of travel of a switch making head. A tubulation holder on the head picks up the cut section and inserts it into one end of a glass tube adjacent one of the reeds. After the two ends of the glass tube are sealed, a controlled atmosphere is introduced through the tubulation, and the tubulation is then welded closed.

This invention relates to a new and improved sealed magnetic switch and to a method of and an apparatus for making the sealed switch.

Sealed magnetic contact or reed switches are used in a larger number of different applications in which their superior characteristics can be utilized. In certain applications, such as line switches or crosspoints in communication systems, the use of sealed magnetic switches would be quite desirable, but the breakdown potential of the usual reed switch, i.e., on the order of 250 volts RMS or 300 volts DC, is substantially lower than the breakdown potential of around 800 volts RMS or 1100 volts DC desired in this particular application. The necessary increase in the breakover potential can be obtained by establishing an atmosphere at elevated pressures within the housing of the switch. However, this is not easily done with automatic manufacturing machinery and becomes even more difficult with sealed switches of very small size.

One technique that has been used to automatically manufacture sealed reed switches is decribed in United States Patent No. 3,203,081. This technique involves placing the entire switch assembling head in a chamber which is elevated in pressure so that an elevated pressure will be retained in the housing after the seals at the ends of the switch housing are formed within the pressurized atmosphere of the chamber. However, the atmosphere within the switch housing is heated during the formation of the end seals, and, as a result, the pressure of the switch atmosphere drops far below the desired value on cooling. In addition, there are substantial problems in sealing and moving the large pressurized chamber with the result that the process is slow and expensive, and the ranges of pressures that can be obtained are severely limited.

Accordingly, one object of the invention is to provide a new and improved sealed magnetic switch.

Another object is to provide a sealed magnetic switch construction having tubulation which permits the atmosphere of the interior of the switch to be controlled and which does not adversely affect the magnetic characteristics or sensitivities of the switch.

Another object is to provide a new and improved method of making sealed switches having a controlled atmosphere.

A further object is to provide a method of making sealed switches with a controlled atmosphere in which tubulation is sealed in one end of the switch during assembly, is used to control the atmosphere, and is then sealed to retain the desired atmosphere in the switch.

A further object is to provide a new and improved apparatus for automatically making sealed switches having a controlled atmosphere.

A further object is to provide an apparatus for automatically making sealed switches of the type in which a pair of magnetic contact elements are sealed in opposite ends of an insulating housing and in which means are provided for inserting and sealing tubulation in one end of the housing, for controlling the atmosphere of the switch through the tubulation, and for closing the tubulation.

Another object is to provide an apparatus for automatically making sealed switches of the type in which a pair of contact elements are sealed in opposite ends of an insulating housing, which apparatus includes new and improved means for feeding and inserting tubulation into an open end of the housing.

A further object is to provide an apparatus for automatically making sealed switches of the type in which a pair of magnetic contact elements are sealed in opposite ends of an insulating housing and which includes new and improved means for pressurizing the interior of the switch and removing the pressurized switch from the apparatus.

A further object is to provide new and improved means for cutting and feeding tubulation.

Many other objects of the invention will become apparent from considering the following detailed description in conjunction with the drawings in which:

FIG. 2 is an enlarged sectional view taken generally along line 2—2 in FIG. 1 illustrating the relationship of a switch assembling head on the machine to a tubulation cutting and feeding assembly;

FIG. 3 is a sectional view taken along line 3—3 in FIG. 2;

FIG. 4 is an enlarged sectional view taken generally along line 4—4 in FIG. 1 illustrating the tubulation cutting and feeding assembly;

FIG. 5 is a top elevational view of the assembly shown in FIG. 4;

FIG. 6 is an enlarged fragmentary top elevational view taken in the general direction of line 6—6 in FIG. 4;

FIG. 7 is an end elevational view in partial section taken in the direction of line 7—7 in FIG. 4;

FIG. 8 is a sectional view taken along line 8—8 in FIG. 4;

FIG. 9 is an enlarged sectional view taken along line 9—9 in FIG. 7;

FIG. 10 is a fragmentary perspective view of a movable tubulation cutting die and feeding unit in the tubulation cutting and feeding assembly;

FIG. 11 is an enlarged sectional view taken along line 11—11 in FIG. 5 showing the feeding assembly in a normal condition;

FIG. 12 is a sectional view similar to FIG. 11 illustrating the tubulation cutting and feeding assembly in an actuated condition and shown in relation to a tubulation holding and inserting means forming a part of the assembling head on the machine;

FIG. 13 is a front elevational view of the tubulation holding and inserting assembly taken in the general direction of line 13—13 in FIG. 2 and illustrating two settings of the assembly in solid and dashed line;

FIG. 14 is a sectional view of a latch for the tubulation holding and inserting assembly illustrated in the position viewed from line 14—14 in FIG. 13;

FIG. 15 is a fragmentary view similar to FIG. 14 showing the latching assembly in another position of adjustment;

FIG. 16 is a diagrammatic view similar to FIG. 13 illustrating, in dashed outline, the transfer of the tubulation from the tubulation cutting and feeding assembly to the tubulation holding and inserting assembly on the head assembly, and in solid outline, the insertion of the tubulation into the switch assembly.

FIG. 17 is a fragmentary top elevational view taken in the direction of line 17—17 in FIG. 16;

FIG. 18 is a sectional view taken along line 18—18 in FIG. 16;

FIG. 19 is an elevational view of the head assembly and of the tubulation holding and inserting means in a setting following the manufacture of the switch seals and at the point at which the assembled switch is to be ejected from the machine;

FIG. 20 is an enlarged sectional view taken along line 20—20 in FIG. 19;

FIG. 21 is a top elevational view in partial section taken in the direction of line 21—21 in FIG. 19;

FIG. 22 is a fragmentary front elevational view illustrating the ejection of the switch from the machine;

FIG. 23 is an enlarged sectional view of a portion of a switch manufactured in accordance with the present invention; and FIG. 24 is a fragmentary view of another form of control for removing tubulation from the tubulation cutting assembly.

Figure 1:
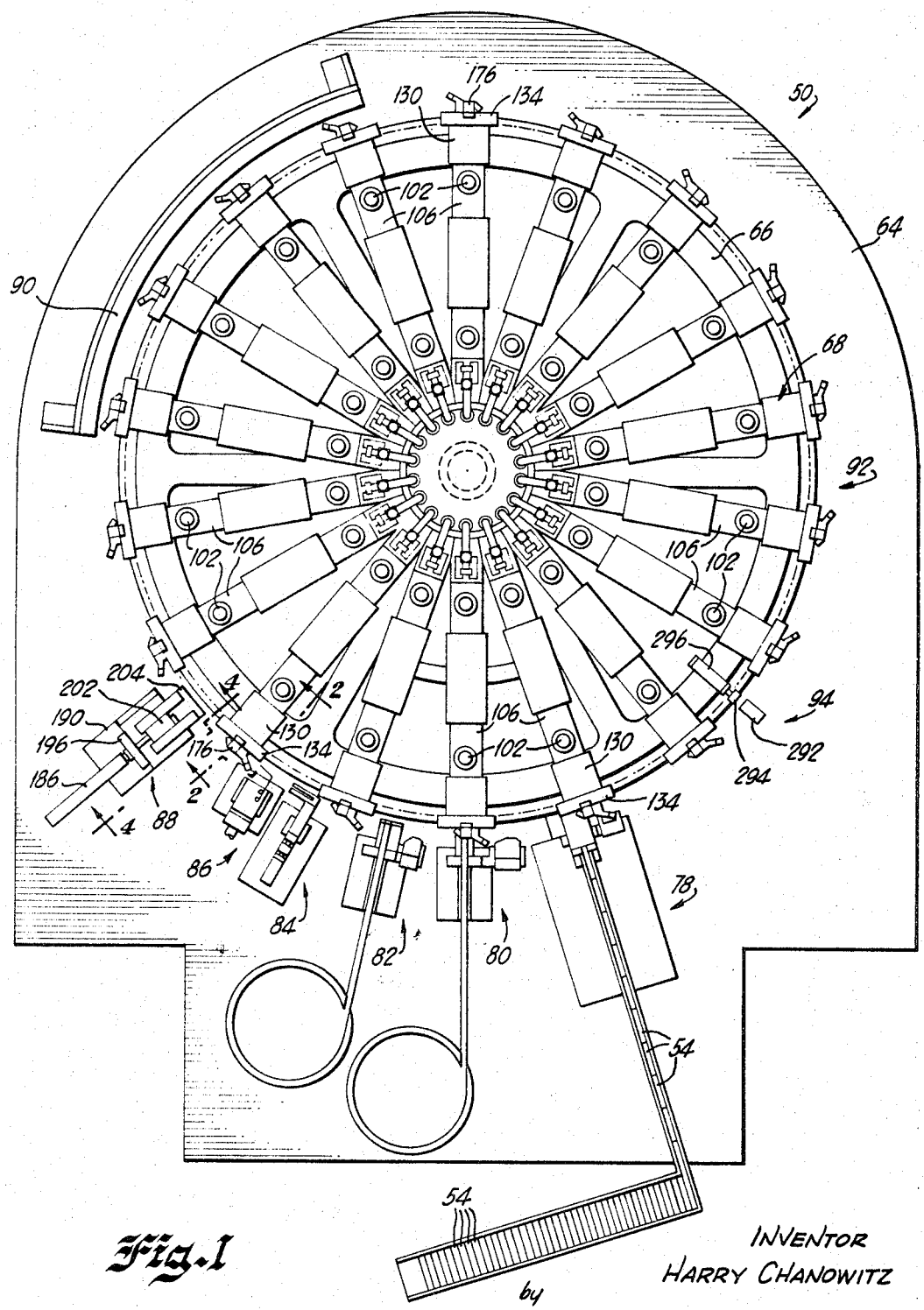
FIG. 1 is a top elevational view of an apparatus for making sealed switches which embodies the present invention.

Referring now more specifically to FIG. 1 of the drawings, therein is illustrated a machine 50 for automatically making pressurized small reed switches 52 (FIGS. 22 and 23). Each switch 52 comprises an elongated glass housing or tube 54 in one end of which a magnetic reed 56 is sealed. A second magnetic reed or contact element 58 is sealed in the other end of the glass tube 54 so that the inner ends of the reeds 56 and 58 are disposed in an overlapped and spaced position to define a gap therebetween. A switch of this construction is well known and generally possesses a breakover voltage characteristic of around 250 volts RMS. The switch 52 of the present invention obtains substantially increased breakover voltages of, for instance, 800 volts RMS or 1100 volts DC, by pressurizing a cavity 60 formed by the interior of the housing 54 with an atmosphere of nitrogen at a pressure of around 100 pounds per square inch. This switch 52 can attain standoff or breakover voltages of as high as 2000 volts DC by pressurizing the cavity to 200 pounds per square inch.

To provide means for controlling the atmosphere in the cavity 60, a length of magnetic tubing or tubulation 62 is sealed in one end of a glass tube or housing 54 in a position extending generally parallel to and spaced from the magnetic terminal 58. The pressurized gas is introduced into the cavity 60 by the machine 50 following the production and cooling of the seals at the two ends of the housing 54. When the desired atmosphere has been obtained, the tubulation 62 is closed, as by welding the tubing 62 to the adjacent portion of the magnetic contact element 58. Since the tubulation 62 is formed of magnetic material and is welded or bonded to the magnetic terminal 58, the tubulation 62 and the magnetic contact element 58 form a common magnetic body, and the presence of the tubulation 62 does not alter or adversely affect the magnetic characteristics of the switch 52. An inner end 62b of the tubulation 62 extends into the cavity 60 only a distance sufficient to place the tubulation in communication with the cavity and does not extend in proximity to the gap formed between the inner ends of the magnetic elements 56 and 58 and thus does not change the characteristics of the switch. The portion of the tubulation 62 above the point at which it is welded or otherwise joined to the contact element 58 shown in FIG. 23 can be removed.

In one switch 52 made in accordance with the present invention, the glass tube 54 has an ID of .085″, an OD of .142″, and a length of .912″. The reeds 56 and 58 each have a length of .312″, a width of .045″, and a thickness of .010″. The tubulation 62 has an ID of .004″ and an OD of .012″. This switch has been automatically fabricated by the apparatus 50 and pressurized to 100 p.s.i. to attain breakover voltages of 1100 volts DC. Greater breakover voltages have been obtained using greater pressure in the cavity 60.

Referring now more specifically to the construction of the machine or apparatus 50, the general design or construction of this machine is of the type shown and described in detail in United States Patent Nos. 2,984,046 and 3,016,144, and further details of the construction of the head assemblies and the component feeding assemblies are shown and described in detail in the copending applications of Harry Chanowitz et al., Serial No. 309,449, filed Sept. 17, 1963, now Patent No. 3,282,670, and of Harry Chanowitz, Ser. No. 440,697, filed Mar. 18, 1965, both of which copending applications are assigned to the same assignee as the present application. A disclosure and description of the components shown in these prior applications and patents is included in the present application only to the extent that it is necessary to an understanding of the present invention.

Referring now more specifically to FIG. 1 of the drawings, therein is illustrated the machine 50 which includes a floor or ground supported base or main frame 64 on which is rotatably mounted a table 66 carrying a plurality of reed switch manufacturing head assemblies 68. The table 66 rotates in a clockwise direction (FIG. 1) relative to the supporting base 64. Each of the head assemblies 68 includes an upper reed chuck assembly or supporting means 70 (FIG. 18) for holding the upper reed 58, a glass chuck assembly or supporting means 72 for holding the glass tube 54 and the heaters therefor, and a lower reed chuck or supporting means 74 for holding the lower reed 56. A holding and inserting assembly 76 for the tubulation 62 is movably mounted on the upper reed chuck assembly 70. The three chuck assemblies 70, 72, and 74 in each of the head assemblies 68 can be moved between a contracted position (FIG. 18) in which the switch components are assembled and an expanded position in which these three chuck assemblies are spaced vertically from each other to receive the individual components.

Referring now more specifically to the general operation of the machine 50, the head assemblies 68 are placed in an expanded condition in which the chuck assemblies 70, 72, and 74 are in vertically spaced positions as the rotating table 66 approaches a station or assembly 78 at which a glass tube 54 is fed to and held in the glass chuck 72. During further rotation of the table 66, a lower reed 56 is supplied to and held in the lower reed chuck 74 by a lower reed feeding assembly or station 80. The upper reed 58 is next fed to and held in the upper reed chuck 70 at or by an upper reed feeding assembly or station 82. The head assembly 68 is then contracted so that the tube 54 first moves down over the lower reed 56 to be partially inserted in the lower end of the tube. Continuing rotation of the table 66 initiates downward movement of the upper chuck assembly 70 during which the upper reed 58 passes through an upper reed aligning and guiding assembly or station 84 to be inserted into the upper end of the glass tube 54. During the inserting movements of the upper reed 58, an assembly or station 86 cams the adjacent end of the lower reed 56 away from the upper reed 58 to insure that these reeds do not move into abutting relationship. A heating means for forming the seal for the upper reed 58 can be energized during these movements to start the softening of the upper end of the glass tube 54.

During the ensuing clockwise movement of the table 66, the glass at the upper end of the tube 54 begins to soften, but the upper end of this tube is not closed. The head assembly 68 now approaches a tubulation cutting and feeding assembly 88, and the assembly 88 severs a discrete length of the tubulation 62 from a supply thereof and moves this tubulation into proximity to the path of movement of the upper reed chuck assembly 80, or more specifically, into alignment with the path of movement of the tubulation holding and inserting assembly 76 carried on the assembly 70. When these two assemblies are in substantial vertical alignment, the assembly 76 is actuated to pick up the tubulation 62 by coupling to the upper end thereof. During a subsequent portion of the clockwise movement of the table 66, the assembly 76 is again actuated to move downwardly to insert the lower end of the tubulation 62 through an opening in the upper reed chuck assembly 70 and into the upper end of the tube 54 in a position extending generally parallel to but spaced from the upper reed 58.

The head 68 remains in this position with the upper end of the tube 54 being heated to form the upper seal for the tubulation 62 and the upper reed 58 as this head is advanced to a point in its path of rotation at which it is disposed in proximity to an arcuate permanent magnetic means 90 mounted in a fixed position on the supporting frame 64. At this time, the upper reed chuck 70 is opened to release the upper reed so it is held in position during the completion and cooling of the upper seal by magnetically induced adherence to the lower reed 56 which is held in a fixed position in the lower reed chuck 74. This insures proper orientation of the mating surfaces of the two reeds 56 and 58 and permits the upper reed 58 to seek a suitable position during the solidification of the glass in the upper seal.

The energization of the means for heating the lower end of the tube 56 can overlap that of the heating means for the upper end of the tube 54 to provide means for starting the softening of the glass at the lower end of the tube 54. As the given head 68 moves beyond the influence of the field provided by the magnetic means 90 and at a time when the formation of the seal for the lower reed 56 has begun, the lower reed chuck assembly 74 is moved axially inwardly toward the center of rotation of the table 66 to separate the inner ends of the reeds 56 and 58 and thus establish the operating gap between these two magnetic contact elements. The heating of the lower end of the tube 54 is discontinued, and the glass is allowed to solidify with the chuck 74 and the lower reed 56 held in the offset position defining the proper gap with the upper reed 58. During the continuing clockwise rotation of the table 66, the glass in the upper and lower seals is allowed to cool and solidify.

At a suitable point, such as the point indicated generally by the reference character 92 (FIG. 1), a valve mechanism is rendered effective to connect the pressurized source of gas, such as nitrogen, to the assembly 76 on the given head assembly 68 so that the pressurized fluid flows through the tubulation 62 into the now sealed interior 60 of the tube 54 to establish the desired pressurized atmosphere within the switch. This connection between the tubulation 62 and the source of pressurized fluid can be continued for so long as is necessary.

To provide means for closing the tubulation 62 and for removing the completed switch 52 from the head assembly 68, a welding or sealing and switch removing station or assembly indicated generally as 94 is provided. As the head 68 approaches this station, the glass chuck 72 and the lower reed chuck 74 are opened so that the completed switch 52 is supported on the head assembly 68 only by its connection with the tubulation holding and inserting assembly 76. Further, the head assembly 68 starts to move to an expanded position during which the upper chuck assembly 70 and the switch 52 carried thereon are first elevated relative to the chuck assemblies 72 and 74 which remain in adjacent positions. This extracts the completed switch 52 from the open chucks 72 and 74. When the lower end of the switch has cleared the chuck 72, the assembly 94 is actuated to force a pair of welding electrodes against the upper reed 58 and the tubulation 62 and to both close the tubulation 62 and weld this tubulation to the adjacent portion of the upper reed 58. The station 94 is mounted in a fixed position relative to the base 64 and, in clamping the switch 52 against movement, extracts this tube from the tubulation assembly 76. This extraction is facilitated by releasing the coupling between the tubulation 62 and the assembly 76. As the head 68 clears the station 94, the welding jaws are released to drop the completed switch 52 to suitable receiving or conveying means.

As indicated above, the general construction of the switch manufacturing apparatus or machine is of the type shown and described in detail in United States Patent Nos. 2,984,046 and 3,061,144. This general arrangement includes means for rotatably mounting the table 66 relative to the supporting frame or table 64 and the arrangement for selectively expanding and contracting the individual head assemblies 68 as they move relative to the various stations on the base or frame 64 as well as means for opening and closing the chucks and for effecting the heating of the opposite ends of the glass tubing 54 to form the upper and lower seals. As shown in these patents, each of the individual head assemblies 68 includes a lower supporting element 100 (FIG. 2) which is movable with the table 66 and on which is mounted the lower reed chuck assembly 74. The lower supporting member 100 carries a pair of guide rods 102 on which are slidably supported in spaced vertical positions two additional supporting elements 104 and 106 on which the glass chuck assembly 72 and the upper reed assembly 70 are respectfully mounted. The supporting frames 104 and 106 are shifted to positions spaced vertically from each other and from the lower support 100 under the control of a shouldered rod and cam track (not shown) carried on the frame 64 during the rotation of the table 66 in the manner shown and described in detail in the above-identified patents to expand and contract the heads 68 so as to permit the components of the switch to be fed to the head assemblies 68 and then moved into an assembled relationship during the formation of the switch.

The construction of the upper reed chuck assembly 70, the lower reed chuck assembly 74, and the glass chuck assembly 72 are shown and described in detail in the copending application of Harry Chanowitz. Further, the construction and operation of the glass tube feeding assembly 78, the reed transfer or feeding assemblies 80 and 82, and the reed guiding and deflecting assemblies 84 and 86 are also the same as those shown and described in detail in the copending Chanowitz application. Accordingly, these assemblies are only briefly described herein.

In general, the lower reed chuck assembly 74, which is supported on the lower supporting element 100, includes a fixed jaw 108 (FIGS. 2 and 18) carried on the support 100 and a movable jaw 110 movable between spaced open and closed settings. The jaw 110 is resiliently biased by a connected tension spring 112 (FIG. 2) and is shifted between its open and closed positions by cams or actuator arms mounted in fixed positions on the table 64 adjacent the path of movement of the head assemblies 68.

The glass chuck assembly 72 (FIGS. 2 and 18) is carried on the center support 104 and includes a fixed jaw 114 (FIG. 18) and a movable jaw 116. The jaw 116 is also moved between an open position in which a tube 54 can be fed to the assembly 72 and a closed position in which the tube 54 is held against the fixed jaw 114 by actuating arms or cams carried in fixed positions on the table 64 adjacent the path of rotation of the head assemblies 68. The glass chuck assembly 72 also includes an upper heating element 118 for heating the upper end of the glass tube 54 to form the upper seal and a lower heating element 120 to heat the lower end of the glass tube 54 to form the lower seal. These heating elements are selectively energized by the means shown in the above-identified United States patents and can be energized in the sequence described in detail in the copending application of Harry Chanowitz et al. The glass chuck assembly 72 also includes a gas supplying means indicated generally as 122 (FIG. 18) for supplying a flow of forming gas in different quantites and at different times during a cycle by the means and in the manner described in detail in the pending Chanowitz and Chanowitz et al. applications.

The upper reed chuck assembly 70 is substantially identical to that shown and described in detail in the copending Chanowitz application and includes a movable jaw 124 (FIGS. 2, 17, 18, and 21) and a fixed jaw 126. Both of these jaws are pivotally mounted on the upper support 106 and are actuated between a closed position shown in FIGS. 17 and 18 and an open position shown in FIG. 21 by actuating arms or cams carried in fixed positions on the frame 64 adjacent the path of rotation of the head assembly 68. The fixed jaw or relatively fixed jaw 126 differs from the same jaw shown in the copending Chanowitz application in including not only a first notch 126a (FIG. 21) for receiving the upper reed 58 but also a second recessed portion 126b for receiving the tubulation 62. The tubulation 62 is not clamped in the recess 126b by the movable jaw 124 but passes therethrough to permit the tubulation 62 to be inserted into the tube 54 through the uper reed chuck assembly 70 in a position disposed inwardly toward the center of rotation of the table 66 from the upper reed 58 (FIG. 18).

The upper reed chuck assembly 70 or, more specifically, the supporting element 106 therefor also carries the tubulation holding and inserting assembly 76. As set forth above, the assembly 76 receives a discrete length of tubulation from the cutting and transfer assembly 88, inserts this tubulation into the upper end of the housing 54, provides means for pressurizing the interior 60 of the switch 52, and provides a means for retracting the completed switch 52 from the head assembly 68 and for discharging the completed switch from the machine 50. The assembly 76 includes a supporting member 130 which is secured to an upper surface of the supporting element 106 (FIGS. 2 and 19) and carries, in fixed positions, a pair of laterally spaced guide rods 132 which are slidably received within aligned openings formed in upper and lower portions 134a and 134b of a generally rectangular supporting frame 134. A controlled gland assembly 136 is carried on the lower portion 134b of the frame and provides means for receiving the tubulation 62 and for coupling this tubulation to a source of pressurized fluid.

The gland assembly 136 comprises a generally cylindrical body 138 (FIG. 18) having a shouldered lower portion 138a which is disposed within a circular opening in a supporting plate 140 that is secured to the lower wall of the frame portion 134b, as by a plurality of machine screws 142. A recessed area in the upper surface of the member 138 receives a block or pad 144 of resilient material through which extends a centrally disposed opening communicating with an aligned opening in the body 138 which terminates at its lower end in a tapered or flared portion 138b. The upper end of the tubulation 62 is directed and guided by the flared portion 138b into the opening in the member 138 to pass into and through the aligned opening in the resilient body 144.

To provide means for sealing the upper end of the tubulation 62 in the controllable gland assembly 136, a generally cylindrical body 146 is provided with an internal cylindrical bore in which is slidably mounted the outer surface of the body 138. The body 146 further includes a counterbored portion 146a for receiving the upper end of the tubulation 62. The vertical dimension of the resilient body 144 is normally such that this body engages the end wall of the bore in the member 146 to hold this member spaced slightly above the adjacent surface of the body 138.

The tubulation 62 is selectively sealed in the gland assembly 136 by applying stresses to the resilient body 144. More specifically, a generally L-shaped lever 148 is pivotally mounted within a recess 150 in the lower portion 134b of the supporting frame 134 by a pivot pin or shaft 152. A rounded lower leg 148a bears on the upper surface of the cylindrical member 146, and an upper leg 148b of the lever 148 carries a cam follower pin 154. A compression spring 156 received within an aperture 158 in the port 134b of the supporting frame bears against the left-hand (FIG. 18) surface of the lever 148 to bias this lever in a clockwise direction about the pivot pin 152 so that the leg 148a normally bears on the top wall of the member 146 to stress or compress the body 144. This seals the uper end of the tubulation 62 with its upper end in open communication with the counterbore or recess 146a. This recess is placed in communication with a source of pressurized fluid through a line 159 (FIGS. 19, 20, and 22).

When the tubulation 62 is to be inserted into or removed from the controlled gland assembly 136, a cam bears against the cam follower pin 154 and pivots the lever 148 in a counterclockwise direction about the shaft 152 (FIG. 18) against the action of the compression spring 156. This moves the leg 148a of the lever 148 away from the member 146 and permits this element to be moved vertically upward by the resilient body 144. The removal of the stressing or distorting force from the body 144 permits the opening thereto to return to its normal configuration and either to permit the insertion or the removal of the tubulation 62.

The tubulation holding and inserting assembly 76 is movably mounted on the upper reed chuck assembly 70 to permit the tubulation 62 to be picked up at the station 88, to permit this tubulation to be inserted into the glass tubing 54, and to permit the completed switch 52 to be removed from the head assembly 68. As set forth above, the supporting frame 134 is slidably mounted on the element 130 by means of the vertically extending guide rods 132. The assembly 76 includes a latch assembly or control means 160 (FIGS. 2, 3, and 13–15) for controlling the different positions to which the assembly 76 can be moved relative to the assembly 70. The latch assembly 160 includes a generally L-shaped lever 162 which is pivotally mounted on the supporting element 130 by a shouldered machine screw 164. One end of the lever 162 is connected to one end of a tension spring 166, the other end of which is connected to apin 168 secured to the member 130. This biases the lever 162 for clockwise movement (FIG. 3) about the axis of the machine screw 164, and this clockwise movement is limited by a stop pin 170 carried on the element 130. An intermediate portion of the lever 162 carries a vertically extending portion 162a having a step or stop surface 162b formed therein. When the lever 162 engages the stop pin 170, the upper end of the projection 162a is disposed beneath and bears against the lower surface of the upper portion 134a of the rectangular frame to hold the assembly 76 in the position shown in FIG. 2.

When the assembly 76 is to be moved downwardly toward the assembly 70, a first increment of movement so as to enable the assembly 76 to receive a length of tubulation 62 from the station 88, an actuator or arm secured in a fixed position on the base 64 engages a free end 162c of the lever 162 and pivots this lever in a counterclockwise direction about the machine screw 164 against the action of the tension spring 166 to the position shown in FIG. 14 so that the upper end of the arm 162a moves from beneath the upper portion 134a of the frame 134 and the stop surface 162b is disposed therebeneath. The frame 134 then drops by gravity so that it engages the stop surface 162b and, in doing so, drops the controlled gland assembly 136 to a position in which the tubulation 62 is picked up from the station 88. The stop lever 162 is not returned to its normal position after the actuator no longer engages the portion 162c of the lever because engagement of the side of the frame portion 134a by the side of the projection 162a limits movemnet of the lever 162 by the spring 166.

At a subsequent position at which the tubulation 62 carried in the controlled gland assembly 136 is to be inserted into the housing 54, another operator engages the free end 162c of the lever 162 to deflect this lever further in a counterclockwise direction (FIG. 3) about the machine screw 164 to the position shown in FIG. 15 so that the stop surface 162b is moved from beneath the upper portion 134a of the frame 134. This permits the frame 134 to drop further until the lower surface of the portion 134a engages the upper surface of the lever 162. During this movement, the tubulation 62 is inserted into the open upper end of the glass tube 54.

To provide means for elevating the assembly 76 and for controlling the downward movement thereof, a plate 172 (FIGS. 2 and 19) is secured to the front wall of the upper portion 134a of the frame 134 by a machine screw 174. The upper end of the plate 172 rotatably supports a cam follower roller 176. This roller is adapted to engage cam tracks secured in fixed positions on the supporting frame 64 to either elevate or control the descent of the frame 134 and the components carried thereon.

Considering the movement of a single head assembly 68 through a complete cycle of revolution of the table 66 to manufacture a single sealed and pressurized switch 52, the three chuck assemblies 70, 72, and 74 forming a given head assembly 68 are in their expanded position as the head assembly 68 approaches the glass tube feeding station or assembly 78 (FIG. 1). Further, all of the chuck assemblies 70, 72, and 74 are open at this time. As the head assembly 68 reaches the station 78, a tube 54 is fed from the station 78 in the manner described in detail in the pending Chanowitz application, and the jaw 116 is moved to its closed condition to clamp the glass tube 54 in the glass chuck assembly 72 with the upper and lower ends of the tube encircled by the heating elements 118 and 120 and with the aspirator or gas supplying unit 122 communicating with the lower end of the tube.

Further clockwise movement of the table 66 moves the given head assembly 68 to the lower reed feeding station or assembly 80 at which the lower reed 56 is fed to the lower reed chuck assembly 74, and this chuck assembly is moved to its closed condition so that the movable jaw 110 clamps the lower reed 56 in engagement with the fixed jaw 108. Continuing movement of the table 66 in a clockwise direction toward the upper reed feeding station 82 moves the given head assembly 68 to a position in which the upper reed 58 is fed to the upper reed chuck assembly 70, and the movable jaw 124 is moved to its closed position to clamp the reed 58 against the relatively fixed jaw 126 in the recess 126a.

The head 68 then initiates its movement toward its contracted position. During the initial part of this movement, the glass chuck assembly 72 and the upper reed assembly 70 are maintained in positions spaced from each other, but these two chuck assemblies are moved downwardly relative to the lower reed chuck assembly 74 so that the upper end of the lower reed 56 is inserted into the lower end of the glass tube 54. During continuing clockwise movement of the table 66, the upper reed chuck assembly 70 starts to move downwardly toward the glass chuck assembly 72 and the lower reed chuck assembly 74 which are moving in parallel planes. This movement inserts the lower end of the upper reed 58 into the upper end of the glass tube 54. During this movement, the reed 58 carried in the upper reed chuck aessmbly 70 passes through a bifurcation in the guding assembly 84 to insure its alignment with the upper end of the tube 54, and the lower reed 56 is engaged by the deflecting means at the station 86 at a point above that at which it is held by the lower reed chuck assembly 74 to cam the lower reed 56 toward the inside of the tube 54 to insure clearance between the adjacnt ends of the reeds 56 and 58 so as to avoid interference therebetween.

During this interval, the heating of the upper element 118 is initiated to start the softening of the glass of the upper end of the tube 54 for forming the upper seal, and the processing gas is supplied by the assembly 122. These operations can be preformed in the manner described in detail in the above-identified Chanowitz and Chanowitz et al. applications. Further, the constructions of and the operations of the assemblies or stations 78, 80, 82, 84, and 86 are set forth in detail in the pending Chanowitz application.

Continuing clockwise rotation of the table 66 now moves the given head assembly 68 toward the tubulation cutting and feeding assembly 88. This assembly (FIGS. 2 and 5-12) is mounted in a fixed position on the supporting base or frame 64 adjacent the path of movement of the head assemblies 68 on the rotating table 66. The assembly or station 88 generally consists of a tubulation feeding assembly indicated generally as 180 (FIG. 4) which is actuated by a hydraulic cylinder 182 or electric solenoid for feeding tubulation from a bulk supply thereof and a tubulation cutting and transfer assembly indicated generally as 184 which is actuated by a hydraulic cylinder 186 or electric solenoid to sever a descrete length of tubulation 62 from a bulk supply 62a thereof and to transfer the severed length to the adjacent head assembly 68 in timed relation to its movement. The two assemblies 180 and 184 at the station 88 are mounted in a fixed position on the supporting base 64 by a supporting frame consisting of a bottom plate 188 (FIG. 7) and a top plate 190 joined at one side by a shaft or rod 192 and at the other side by a plate 194.

The cutting and transfer assembly 184 is carried on the top plate 190 and includes a supporting bracket 196 carried by the top plate 190 and secured to the forward end of the cylinder 186. A piston rod 198 forming a part of the cylinder 186 is secured, as by a pin 200 (FIG. 11), at its forward end to a shiftable die supporting slide 202 having a pair of flanged portions 202a and 202b at its opposite edges (FIG. 7). To slidably mount the slide 202 on the top plate 190, this plate is formed with a recess in which a plate 204 is secured, and a pair of generally L-shaped elements 206 and 208 are secured to the plate 204 with their legs extending in opposite directions and overlying the portions 202a and 202b to form a way in which the slide 202 is slidably mounted. A pin 210 carried on the slide 202 extends downwardly into a recess 212 (FIG. 11) in the plate 204 to limit and guide movement of the slide 202 relative to the plates 190 and 204.

The slide 202 carries a movable cutting, severing, or shearing means comprising a generally rectangular plate 214 of a hardened material, such as tungsten carbide, which is secured in a recess on the lower wall of the slide 202 by a plurality of pins 216 and a threaded fastener 218. The forward end of the plate 214 includes a circular aperture 214a adapted to receive the elongated length 62a of tubulation 62. To provide means for supporting the severed length of tubulation 62, a plate 220 (FIGS. 10 and 11) is secured to the front wall of the slide 202 by a plurality of pins 222 and a threaded fastener 224. One edge of the plate 220 includes an elongated notch or recess 220a which is disposed above and in alignment with the circular opening 214a in the die plate 214 to provide means for supporting the severed tubulation 62. A fixed cutting die 226 (FIG. 11) is disposed in an opening in the plate 204 and includes an opening aligned with an enlarged opening 190a in the plate 190 through which the continuous length 62a of tubulation is supplied to the cutting dies 214 and 226.

The tubulation cutting and transfer assembly 184 normally occupies the position shown in FIG. 11 in which a length of tubulation 62 has been advanced from the continuous length 62a thereof to be disposed in the aperture 214a in the die 214 with the portion projecting thereabove in the recess 220a in the supporting plate 220. As the head assembly 68 approaches the station 88, a cam individual to this head and carried on the rotating table 66 actuates a miniature switch or other control device carried in a fixed position on the supporting base 64 to energize the double-acting cylinder 186 so that the piston therein attempts to move the piston rod 198 to the right (FIG. 11). However, only a very short movement of the piston rod 198 and the connected slide 202 is permitted at this time.

More specifically, a stop pin 228 passing through aligned openings in the plates 190 and 204 projects into an opening or recess 230 in the slide 202. A very small clearance exists between the rear or left-hand (FIG. 11) wall of the opening 230 and the adjacent portion of the stop pin 228. Thus, the slide 202 moves a short distance to the right that is not adequate to sever the length of tubulation 62 but is sufficient to clamp this tubulation between the moving die 214 and the fixed die 226. This prevents movement of the continuous length of tubulation 62a. At this time, the tubulation feeding assembly 180 is actuated to a retracted position also under the control of switch or other control means carried on the frame 64 which is actuated by cam means on the table 66.

Incident to a predetermined amount of movement of the assembly 180, the stop pin 228 is retracted below the plane of the slide 202, and the slide is freed to move from the position shown in FIG. 11 to the position shown in FIG. 12. This movement severs a discrete length 62 of the continuous length 62a of tubulation disposed above the upper surface of the fixed die 226 and transfers it to a position in which it can be transferred to the controlled gland assembly 136. The control means for the cylinder 186 are then actuated to move the piston rod 198 to the left so that the slide 202 moves from the position shown in FIG. 12 to the position shown in FIG. 11 in which the opening 230 is aligned with the stop pin 228 and the opening 214a is aligned with the opening in the fixed die block 226. At this time, the tubulation feeding assembly 180 is operated to feed a predetermined length of tubulation from the continuous length 62a thereof into the position shown in FIG. 11.

The tubulation feeding assembly 180 at the station 88 includes a slide 232 (FIGS. 4, 7, and 8) slidably mounted against an inner surface of the wall 194 by a pair of L-shaped elements 234 and 236 defining a guideway. The lower end of the slide 232 is connected to a piston rod 238 (FIG. 7) connected to the operating cylinder 182 for the assembly 180. Adjacent its upper end, the slide 232 is connected to a plate 240 (FIG. 8) by one or a plurality of machine bolts 242 and the outer or forward end of the plate 240 is connected to a plate 244 forming part of a pawl assembly by a machine screw 246 (FIGS. 7 and 8) and a plurality of pins 248 (FIG. 7). An outer end of the plate 244 includes a generally V-shaped groove or recess 250 (FIG. 9) adapted to receive an intermediate length of the continuous length 62a of tubulation. The remainder of the pawl is provided by a pawl arm 252 which is pivotally mounted between a pair of upstanding ears 244a on the plate 244 by a pivot pin 254. The free outer end of the pawl arm 252 is connected by a tension spring 256 to a pin 258 carried on the plate 240. The tension spring 256 continuously biases the pawl 252 toward the plate 244 to resiliently clamp the continuous length 62a of the tubulation in a position within the groove 250.

The continuous length 62a of tubulation is fed from a bulk supply, such as a reel thereof, disposed on or beneath the supporting base or frame 64 through an opening in the bottom plate 188 and through a guide assembly 259. The length 62a of tubulation then passes through the groove 250 in the plate 244 and is clamped therein by the resiliently biased pawl 252. The upper portion is disposed in the aligned openings in the plates 190 and 204 and the fixed die 226, the aperture 214a in the movable die 214, and the recess 220a in the plate 220.

The feeding assembly 180 includes means for controlling shifting movement of the stop pin 228. This stop pin is slidably mounted in a hole in a plate or member 260 (FIGS. 4 and 8) which is secured to and depends from the lower surface of the plate 190. This bore is counterbored at its lower end to receive a compression spring 262 which is interposed between a plate 264 secured to the bottom of the member 260 and a collar 266 secured to the pin 228. The compression spring 262 normally biases the pin 228 to its upper or effective position shown in FIG. 11. The lower end of the pin carries an enlarged circular member 268 (FIGS. 4, 7, and 8).

To provide means for retracting the stop pin 228, a member 270 (FIGS. 4, 7, and 8) is secured to the slide 232 in different adjusted positions by a threaded fastener 272. The member 270 includes a transversely extending and bifurcated arm portion 270a within which the right-hand (FIG. 8) end of the plate 260 is received. In the normal position of the tubulation cutting and feeding assembly 88, the bifurcated portion 270a of the member 270 overlies or is disposed vertically above the circular member 268 secured to the lower end of the stop pin 228.

As set forth above, the movement of the table 66 to bring one of the head assemblies 68 into proximity to the station 88 actuates control elements so that the cylinder 186 is energized to move the piston rod 198 and the connected slide 202 a short distance to the right to bear against the stop pin 228 so that the length of tubulation 62 in the openings in the dies 214 and 226 is clamped against movement. At this time, the cylinder 182 is energized by the control means to retract the piston rod 238 or to move this piston rod downwardly (FIG. 7). This moves the connected slide 232 downwardly as well as the components secured thereto and carried thereon. Since the tubulation 62 is clamped by the dies 214 and 226, the tubulation cannot move and this tubulation remains fixed in position with the plate 244 and the pawl 252 sliding relative to the clamped tubulation as the slide 232 moves downwardly.

After the slide 232 has moved downwardly a distance equal to the length of tubulation to be fed to the head assembly 68, the projecting portion 270a on the member 270 engages the upper surface of the member 268 and retracts the stop pin 228 against the force of the compression spring 262. This releases the slide 202 so that a predetermined length of tubulation 62 is severed from the continuous length 62a thereof and is transferred to a position in which it can be picked up by the controlled gland assembly 136 on the assembly 76. The cylinder 186 then returns the slide 202 to its normal position in which the aperture 214a is aligned with the opening in the fixed die 226. At this time, the cylinder 182 moves the slide 232 upwardly. The continuous length 62a of tubulation is now clamped by the resiliently biased pawl 252 in the recess 250 on the plate 244 and the tubulation moves upwardly as the slide 232 moves upwardly. During this movement, the projecting portion 270a moves out of engagement with the member 268 and the compression spring 262 returns the stop pin 228 to the position received within the opening 230 in the slide 202. Further upward movement of the slide 232 inserts the measured length of tubulation into the opening 214a and the recess 220a in the member 220.

Referring now more specifically to the transfer of the severed length of tubulation 62 from the slide 202 to the assembly 76, the approach of the head assembly 68 to the station 88 causes the movement of the slide 202 from the position shown in FIG. 11 to the position shown in FIG. 12 to sever the length 62 of tubulation and to move this tubulation to a position in which it underlies or is disposed beneath the path of movement of the controlled gland assembly 136. The supporting frame 134 carrying the gland assembly is in its uppermost position in which the lower surface of the upper portion 134a of the frame rests on the upper end of the projection 162a on the latching lever 162 (see FIG. 13). As the head assembly 68 approaches the position in which the gland assembly 136 is aligned with the severed tubulation 62, an operator element 280 (FIGS. 2 and 13) carried in a fixed position on the base 64 engages the outer end 162c of the lever 162 to pivot this lever in a counterclockwise direction about the machine screw 264 to the position shown in FIG. 14. This releases the frame 134 so that it falls by gravity to the position shown in solid outline in FIG. 12 and in dot-and-dash outline in FIG. 13.

During this movement, the pin 154 cams against an operator element 282 carried in a fixed position on the base 64 to pivot the lever 148 in a clockwise direction about the pin 152 (FIG. 12) so that stress is removed from the resilient block 144. This permits the block to return to an undistorted state so that the opening therein is of maximum size and permits the upper end of the tubulation 62 to enter the opening in the member 138 and the resilient block 144 and permits its upper end to enter the recess 146a in the member 146. At this time, the downward movement of the frame 134 moves the pin 154 out of engagement with the operation 282 so that the compression spring 156 pivots the lever 148 in a counterclockwise direction about the pivot pin 142 to again stress the resilient material 144 and to clamp or resiliently secure the tubulation 62 in the gland assembly 136. Thus, the tubulation 62 is now sealed in communication with the pressure source over the line 159.

At this time, the cam follower roller 176 moves into engagement with an upwardly directed cam track 284a on a cam track member 284 secured in a fixed position on the supporting base 64. This elevates the supporting frame 134 slightly and thus elevates the controlled gland assembly 136 so that the lower end of the tubulation 62 is lifted from the opening 214a in the movable die 214. Because the recess 220a is open on one side, the tubulation connected to the gland assembly 136 is now removed from the assembly 88 and is carried on the frame 134. The roller 176 then passes over a substantially horizontal dwell portion 284b on the cam track 284 (FIG. 13). During this movement, the free end 162c of the latching lever 162 engages another operator element 286 (FIG. 13) carried in a fixed position on the supporting base 64 which cams the lever 162 further in a counterclockwise direction about the pivot pin 264 to the position shown in FIG. 15. This moves the supporting surface 162b from beneath the upper portion 134a of the supporting frame and frees this frame for movement to its extreme lower position in which the frame portion 134a rests on the free end 162c of the latching lever 162.

However, because of a downwardly inclined surface 284c on the cam track 284, this downward movement of the frame 134 is gradual rather than abrupt, as shown by the dashed line in FIG. 13 representing the path of movement of the follower roller 176. Thus, the frame 134 and the controlled gland assembly 136 carried thereon are gradually lowered. As illustrated in FIG. 16, this moves the gland assembly 136 from the position shown in dashed outline therein to the position shown in solid outline and inserts the lower end of the tubulation 62 through the opening 126b in the fixed jaw 126 of the upper reed chuck (see FIG. 17) into the upper end of the glass tube 54. As indicated above, the upper end of the glass tube 54 can be softened at this time, but the seal is not completed, and ample clearance remains for inserting the small diameter tubulation 62 into the cavity 60 of the glass tubing 54 between the wall thereof and the adjacent upper reed 58 in a substantially parallel relationship thereto. The extent of the inserting movement is such that the tubulation does not extend into proximity to the gap between the reeds 56 and 58.

In the interval in which the tubulation 62 is inserted into the controlled gland assembly 136 and transported to and inserted into the tube 54, the controls for the cylinder 186 retract the slide 202 from the feeding position shown in FIG. 12 to the normal position shown in FIG. 11. At this time, the controls for the cylinder 182 actuate this cylinder so that the piston rod 238 moves upwardly to the position shown in FIG. 4. In moving upwardly, the projection 270a on the plate 270 moves out of engagement with the member 268, and the spring 262 elevates the stop 228 so that it moves into the aligned opening 230 in the slide 202. Further, during this upward movement of the slide 232, the spring 256 clamps the endless length 62a of tubulation in the recess 250 on the member 244, and the predetermined length of tubulation 62 is fed through the opening 190a, the opening in the fixed die 226, and the opening 214a in the movable cutting die 214 to the position shown in FIG. 11 to condition the assembly 88 for feeding a length 62 of tubulation to the next head assembly 68.

The head assembly 68 with the assembled switch elements including the inserted tubulation 62 are now in the position shown in FIG. 18 of the drawings. The given head assembly 68 moves beyond the assembly 88 toward the permanent magnetic means 90. During this movement, the heating of the top end of the glass tube 54 is continued to soften this glass and to start the formation of the upper seal between the tube 54, the tubulation 62, and the upper reed 58. When the given head 68 moves into proximity to the magnetic means 90, an actuator engages the upper reed chuck assembly 70 and opens this assembly so that the upper reed 58 is held in position in a parallel mating relation with the lower reed 56 under the influence of the applied magnetic field. The tubulation 62 is held in proper position by the controlled gland assembly 136. During movement in which the given head assembly 68 passes the permanent magnetic means 90, the upper seal is completed, and the energization of the upper heating element 118 is terminated.

During this interval in which the upper seal is being completed, the energization of the lower heating element 120 is initiated so that the glass at the lower end of the housing or tube 54 begins to soften. At a point at which the given head assembly 68 has passed beyond the influence of the magnetic means 90, the lower chuck assembly 74 moves radially inward toward the center of rotation of the table 66 a predetermined amount to produce the desired gap between the overlapped ends of the upper reed 58 and the lower reed 56. This sets the operating gap for the switch. The continued heating of the lower end of the tube 54 by the energized heating element 120 continues until the lower glass seal is completed. At this time, the energization of the lower heating element 120 is terminated.

During the ensuing movement of the given head 68, the upper and lower seals for the switch 52 are cooled so that the completed switch is capable of withstanding elevated internal pressures. At this time, a valve means 285 (FIG. 16) on the table 66 forming a part of a pressurizing of atmosphere regulating assembly that is individual to the given head assembly 68 is controlled by cam or operator means carried on the base 64 to supply pressurized fluid or gas such as nitrogen from a source 287 (FIG. 16) to the interior or cavity 60 of the switch 52. The gas supply source 287, the necessary lines, and the valve means 285 can be of the general type shown in the above-identified patents. As set forth above, the establishment of the elevated pressure within the switch 52 increases the voltage at which arcing occurs between the adjacent ends of the upper and lower reeds 58 and 56. If desired, the lower reed chuck assembly 74 can be opened during this increment of movement of the given head assembly 68.

The head assembly 68 now approaches the assembly 94 at which the tubulation 62 is sealed off and the completed switch 52 is removed. As the head assembly 68 approaches the station 94, the lower reed chuck assembly 74 and the glass chuck assembly 72 are opened, if not previously opened. Thus, the switch 52 is supported on the head assembly 68 only by the tubulation 62, the upper end of which is secured in the controlled gland assembly 136. Further, as the head assembly 68 approaches the assembly 94, the cam track on the base 64 actuates the cam follower rod individual to the head 68 to start the expansion of this head assembly. When the head assembly 68 is expanded, the upper chuck assembly 70 and the components carried thereon are first elevated relative to the glass chuck assembly 76 and the lower reed assembly 74 which initially remain in their prior horizontal planes of rotation. This upward movement of the upper reed chuck assembly 70 and the components carried thereon is shown schematically by a dashed line indicated as 288 in FIG. 19 of the drawings. This elevation lifts the switch 52 a sufficient distance that the lower end of the lower reed 56 moves above and out of an interfering relationship with the glass chuck assembly 72 and any component carried thereon, such as the upper heating coil 118.

At this point the elevating cam track on the base 64 includes a dwell portion indicated schematically by a dashed line 290 in FIG. 19. During this movement, the upper portion of the upper reed 58 and the adjacent portion of the tubulation 62 move between a first welding electrode 292 (FIG. 20) held in a fixed position on the base 64 and a movable welding electrode 294 which is spaced radially inward toward the center of rotation of the table 66 from the path of travel of the tubulation 62 and the upper reed 58 on the assembled switch 52. The normal positions of the switch 52 and the welding electrode 294 are shown in dashed outline in FIG. 20.

When the head assembly 68 reaches a position in which the upper portion of the upper reed 58 and the adjacent portion of the tubulation 62 are disposed between the spaced electrodes 292 and 294, a control for a cylinder 296 having a piston rod 298 to which the electrode 294 is connected is actuated. This control (not shown) can comprise a switch actuated by a cam on the table 66 individual to the given head assembly 68. The switch can control a hydraulic valve for selectively admitting pressurized fluid to and exhausting pressurized fluid from the cylinder 296. The supply of fluid to the cylinder 296 moves the piston rod to the right (FIG. 20) so that the movable electrode 294 engages and pivots the switch 52 to the right away from the path of movement of the head 68 and to a position in which the lower end of the switch 52 is disposed above a discharge trough or chute 300 carried in a fixed position on the table 64. This movement of the electrode 294 also forces the tubulation 62 against the reed 58 and the reed 58 against the fixed electrode 292.

When the tubulation 62 and the adjacent upper reed 58 have been forced together (FIG. 20), a large amplitude pulse of current of short duration is passed between the electrodes to weld the tubulation 62 to the upper reed 58. This welding coupled with distortion of the tubulation 62 occasioned by forcing the tubulation against the upper reed 58 and the fixed electrode 292 closes the tubulation and thus completes the sealing of the housing 54 for the sealed switch with the atmosphere at the selected elevated pressure.

The assembly 94 also provides means for removing the completed switch 52 from the head assembly 68. More specifically, when the tubulation 62 and the upper reed pass between the electrodes 292 and 294 and are deflected to the displaced position shown in FIG. 20, such displacement being permitted by the deflection or bending of the somewhat flexible tubing 62, the cam follower roller 176 (FIG. 19) is advanced onto a cam track 302 carried in a fixed position on the supporting base 64. As the head assembly 68 moves through the following portion of its path of rotation, the cam track 302 acts on the cam follower roller 176 to elevate the supporting frame 134a relative to the upper reed chuck 70 which is now travelling in a substantially horizontal plane. This pulls the controlled gland assembly 136 upwardly relative to the upper reed chuck assembly 70 and also upwardly relative to the tubulation 62 and the upper reed 58 which are held in a fixed position on the base 64 by the closed electrodes 292 and 294. At this time, an operator mounted in a fixed position on the base 64 (not shown) similar to the operator 282 (FIG. 12) engages the pin 154 to remove pressure from the resilient member 144. This permits the upper end of the tubulation 62 to be pulled out of the gland assembly 136 as this assembly is moved upwardly relative to the upper reed chuck assembly from the position shown in FIG. 19 to the position shown in FIG. 22. As illustrated in FIG. 22, the tubulation 62 is also deflected by the continuing rotation of the head 68 after the switch 52 is clamped in a fixed position on the base 64 between the electrodes 292 and 294. However, the bending of the tubulation 62 is not important inasmuch as the portion thereof disposed above a weld 304 (FIG. 23) preferably is removed following the discharge of the completed switch 52 from the machine 50.

The completed switch 52 is now held between the jaws 292 and 294 in a fixed position on the supporting base 64 as the given head assembly 68 moves further in a counterclockwise direction toward the station 78. As the given head assembly 68 passes beyond the assembling station 94 and before the movement of the next head assembly 68 into this station, the control means (not shown) for the cylinder 296 moves the piston rod 298 to the left (FIG. 20) so that the movable electrode 294 occupies the position shown in dashed outline. During this movement, the switch 52 is released and drops by gravity into the discharge chute 300.

As the given head assembly 68 moves toward the assembly 78, the expansion of the head is completed to prepare it for the subsequent cycle of rotation during which another switch is made. Further, the cam 302 and the roller 176 complete the elevation of the frame relative to the upper reed chuck assembly 70 to permit the spring 166 to pivot the latching lever 162 back to its normal position in which the projection 162a underlies the lower surface of the frame portion 134a.

FIG. 24 of the drawings illustrates a modification in the cam 284 which is shown in FIG. 13 and which is used to control the extraction of the tubulation 62 from the assembly 88. Since the head assembly 68 is continuously rotated, the least amount of bending or distortion of the tubulation 62 during transfer from the assembly 88 to the head 68 would occur where the slope of the cam surface 284a (FIG. 13) is zero. This slope can be approached by using the arrangement shown in FIG. 24 in which a flat cantilever spring 305 is secured to the cam 284 and, in effect, replaces the cam surfaces 284a and 284b. When the frame 134 is dropped under the control of the operator 280 to the position shown in dot-and-dash outline in FIG. 13, the resilient block 144 is released and then stressed to couple the tubulation 62 in the gland assembly 136. However, the follower roller 176 engages and deflects the free end of the flat spring 305 to the position shown in dashed outline in FIG. 24. As soon as the downward movement of the frame 134 is arrested, the deflected spring 305 almost immediately elevates the frame with the roller 176 rolling over the upper surface of the spring 305 until the descending surface 284c is reached.

In applications in which the force required to stress the resilient block 144 becomes rather high, the camming engagement between the pin 154 and the operator member 282 may tend to slow the descent of the frame 134. This can be avoided by a latch for the lever 148 which is set by momentary engagement with a smaller operator 282 and then released by an operator when the frame 134 starts to move up.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. An apparatus for making pressurized switches of the type having magnetic reed contacts sealed in opposite ends of an insulating housing, which apparatus comprises
   a supporting base;
   a table rotatably mounted on the base;
   a plurality of spaced head assemblies carried on the table, each of the head assemblies including means for supporting the housing and heating the opposite ends thereof, and a pair of reed contact supporting means for supporting a pair of reed contacts in the opposite ends of the housing;
   a tubulation holding means on each of the head assemblies movable between a tubulation receiving position and a tubulation inserting position;
   tubulation feeding means mounted on the base adjacent the path of rotation of the table and the heads carried thereon, the tubulation feeding means including means for sequentially feeding lengths of tubulation to the tubulation holding means in the receiving positions on the head assemblies;
   control means coupled to the tubulation holding means for controlling movement of each tubulation holding means from its receiving position to its inserting position to insert the tubulation into one end of the housing;
   a pressurizing assembly connected to the tubulation holding means to pressurize the interior of the housing through the tubulation held in the tubulation holding means; and
   a sealing assembly movable into engagement with the tubulation after the interior of the housing has been pressurized to close the tubulation.

2. The apparatus set forth in claim 1 in which the tubulation holding means includes
   a resilient body for detachably coupling the tubulation to the holding means, and
   a member movable to one position to stress the resilient body so that it holds the tubulation and to a second position to relieve the stress to permit the insertion and removal of the tubulation.

3. The apparatus set forth in claim 1 in which the sealing assembly includes
   welding electrodes between which the tubulation is moved at one point in the path of rotation of the table, and
   means for moving at least one of the electrodes against the tubulation to weld the tubulation closed.

4. An aparatus for making pressurized switches of the type in which a pair of magnetic reed contacts are sealed in the opposite ends of an insulating housing, which apparatus comprises
   a supporting base;
   a table rotatably mounted on the base;
   a head assembly carried on the base and including both a housing holding means for mounting a housing on the table and a reed contact holding means for holding a reed contact partially inserted into one end of the housing;
   a tubulation feeding assembly carried on the supporting base and including means for feeding successive lengths of tubulation;
   a tubulation holding means including a receiving means for receiving an end of a length of tubulation;
   means mounting the tubulation holding means for movement relative to the head assembly from a first position in which the end of a length of tubulation is received within the receiving means to a second position in which the free end of the tubulation is inserted into one end of the housing; and
   a source of pressurized fluid coupled to the receiving means and operative to supply pressurized fluid to the interior of the housing through the tubulation.

5. An apparatus for making pressurized switches of the type in which a pair of magnetic reed contacts are sealed in the opposite ends of an insulating housing, which apparatus comprises
   a supporting base;
   a table rotatably mounted on the base;
   a head assembly carried on the base and including both a housing holding means for mounting a housing on the table and a reed contact holding means for holding a reed contact partially inserted into one end of the housing;
   tubulation feeding means for feeding a length of tubulation to a given point adjacent the path of rotation of the table with the length of tubulation disposed in a generally upright position;
   tubulation holding means movably mounted on the head assembly and including a receiving means for receiving the upper end of the length of tubulation;
   control means connected to the tubulation holding means to move the tubulation holding means downwardly a first distance when this holding means is disposed above the length of tubulation, the receiving means receiving the upper end of the tubulation and coupling the tubulation to the tubulation holding means to remove the tubulation from the tubulation feeding means, said control means also including means for moving the tubulation holding means with the coupled tubulation downwardly a second distance to insert the lower end of the tubulation into the one end of the housing; and
   a pressurizing assembly coupled to the receiving means for pressurizing the interior of the housing through the tubulation.

6. An apparatus for making pressurized switches of the type in which a pair of magnetic reed contacts are sealed in the opposite ends of an insulating housing, which apparatus comprises
   a supporting base;
   a table rotatably mounted on the base;
   a head assembly carried on the base and including both a housing holding means for mounting a housing on the table and a reed contact holding means for holding a reed contact partially inserted into one end of the housing;
   tubulation feeding means for feeding a length of tubulation to a given point adjacent the path of rotation of the table with the length of tubulation disposed in a generally upright position;
   a structure mounted for reciprocating movement relative to the head assembly;
   gland means carried on the structure and adapted to receive the upper end of the tubulation;
   latching means including cooperating elements on the head assembly and the structure for permitting movement of the structure to two spaced positions;
   control means for controlling the latching means to permit the structure to move to a first position in which the upper end of the tubulation is inserted into the gland means so that the tubulation is carried by the gland means and to a second position in which the lower end of the tubulation is inserted into the housing; and
   a source of pressure coupled to the gland means for pressurizing the interior of the housing through the tubulation.

7. The apparatus set forth in claim 6 in which the gland means includes a resilient body for receiving the upper end of the tubulation; and in which
   means are provided for applying stress to the body and relieving the body from stress to permit the insertion and removal of the upper end of the tubulation.

8. An apparatus for making pressurized switches of the type in which a pair of magnetic reed contacts are sealed in the opposite ends of an insulating housing, which apparatus comprises
   a supporting base;
   a table rotatably mounted on the base;

a head assembly carried on the table and including both a housing holding means for mounting a housing on the table and a reed contact holding means for holding a reed contact partially inserted into one end of the housing;

tubulation holding means movably mounted on the head assembly and movable to insert a length of tubulation carried on the tubulation holding means into the one end of the housing;

tubulation feeding means carried on the base adjacent the path of rotation of the table, said feeding means including a pair of apertured die means, one of which die means is carried in a fixed position on the base spaced from the table and the other of which die means is movably mounted on the base, said feeding means also including drive means connected to the movable die means for moving the movable die means from a position aligned with the fixed die means to a position adjacent the path of rotation of the table so that the fixed and movable die means cut a length of tubulation supplied thereto and the movable die means transfers the severed length of tubulation to the tubulation holding means on the head assembly; and control means for synchronizing the movement of the movable die means and the movable tubulation holding means so that the tubulation holding means moves to a position to receive the cut length of tubulation in a timed relation with the movement of the movable die means to move a cut length of tubulation to a position adjacent the path of rotation of the table.

9. In an apparatus for making a pressurized sealed switch of the type having magnetic elements sealed in a glass tube, a supporting base, a switch assembling head movable along a path relative to the base, said head including means for supporting a glass tube and magnetic elements in vertically spaced and aligned positions, tubulation feeding means carried on the base for feeding a length of tubulation to a point in the path of movement of the head, tubulation holding means movably mounted on the head and movable with the head in the path in a plane normally disposed above the tubulation, and control means engageable with the tubulation holding means for effecting downward movement of the tubulation holding means relative to the head as the head reaches the tubulation feeding means to couple the tubulation to the tubulation holding means and remove the tubulation from the tubulation feeding means and for thereafter effecting further downward movement of the coupled tubulation holding means and tubulation to insert the tubulation into the glass tube.

10. The apparatus set forth in claim 9 including resilient means carried on the base and engaged by the tubulation holding means during its downward movement to elevate the tubulation holding means when the tubulation is coupled thereto.

11. An apparatus for making pressurized switches of the type in which a pair of magnetic reed contacts are sealed in opposite ends of an insulating housing, which apparatus comprises a supporting base;

conveying means movable over a fixed and cyclic path relative to the supporting base;

a plurality of head assemblies carried on the conveying means at spaced positions thereon, each of said head assemblies including both means for mounting a housing with a pair of contacts inserted in its opposite ends and means for forming seals in the opposite ends;

a tubulation holding means mounted on each of the head assemblies movable from a tubulation receiving position to a position inserting a length of tubulation into one end of the housing as each head assembly passes through a given portion of the path;

a tubulation feeding means for feeding a length of tubulation to each tubulation holding means in its tubulation receiving position at a given point in said path;

an atmosphere regulating assembly connected to the tubulation holding means for establishing a desired atmosphere in the interior of the housing through the tubulation; and a closing assembly mounted on the base in a given position relative to the path for closing the tubulation, said closing assembly including a pair of welding electrodes disposed in the path of movement of the tubulation and movable to clamp the tubulation therebetween to hold the switch and remove it from the moving head assembly.

12. The apparatus set forth in claim 11 in which one of the electrodes is mounted in a fixed position on the base offset from the path of movement of the tubulation and the other electrode is movably mounted on the other side of the path, and drive means connected to the other electrode for moving the other electrode toward the one electrode to engage the tubulation and displace the tubulation toward the one electrode.

References Cited

UNITED STATES PATENTS

| | | | |
|---|---|---|---|
| 1,882,613 | 10/1932 | Hunciker | 65—154 XR |
| 2,265,381 | 12/1941 | Malloy | 65—155 XR |
| 2,403,073 | 7/1946 | Geiger et al. | 65—155 XR |
| 2,455,317 | 11/1948 | Schneider | 65—154 XR |
| 2,984,046 | 5/1961 | Brewer et al. | 65—154 |
| 3,282,670 | 11/1966 | Chanowitz et al. | 65—154 XR |

DONALL H. SYLVESTER, *Primary Examiner.*

F. W. MIGA, *Assistant Examiner.*

U.S. Cl. X.R.

65—270, 34, 154, 156; 29—622; 335—151, 83; 219—79